United States Patent
Detwiler

(10) Patent No.: US 6,820,811 B1
(45) Date of Patent: Nov. 23, 2004

(54) DUAL FOCAL LENGTH BAR CODE SCANNER

(75) Inventor: Paul O. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/320,595

(22) Filed: Dec. 16, 2002

(51) Int. Cl.$^7$ ................................................ G06K 7/10
(52) U.S. Cl. ........................ 235/462.37; 235/462.01; 235/462.38; 235/462.39; 235/462.4
(58) Field of Search ...................... 235/462.01–462.49, 235/472.01–47

(56) References Cited

U.S. PATENT DOCUMENTS

| | | | | |
|---|---|---|---|---|
| 5,298,729 A | * | 3/1994 | Wike, Jr. ................ | 235/462.22 |
| 5,420,411 A | * | 5/1995 | Salatto et al. .......... | 235/462.22 |
| 5,473,149 A | * | 12/1995 | Miwa et al. ............ | 235/462.41 |
| 6,138,915 A | * | 10/2000 | Danielson et al. ..... | 235/472.02 |
| 6,188,500 B1 | * | 2/2001 | Rudeen et al. .......... | 359/196 |
| 6,290,135 B1 | * | 9/2001 | Acosta et al. .......... | 235/472.01 |
| 6,536,668 B1 | * | 3/2003 | Detwiler et al. ....... | 235/462.37 |

* cited by examiner

Primary Examiner—Michael G. Lee
Assistant Examiner—Ahshik Kim
(74) Attorney, Agent, or Firm—Paul W. Martin

(57) ABSTRACT

A bar code scanner and method of operation thereof is disclosed. The bar code scanner comprises a housing including a surface having a transparent scanning window; and optical components including a spinner located within the housing. The optical components are arranged to produce both a first set of scan lines focused outside of the housing and remote from the scanning window; and a second set of scan lines focused outside of the housing and adjacent the scanning window. The method includes the steps of placing a bar code to be read in either a first position where said first set of scan lines are focused or in a second position wherein said second set of scan lines are focused.

6 Claims, 2 Drawing Sheets

DUAL FOCAL LENGTH BAR CODE SCANNER

The present invention relates generally to bar code scanners and, more specifically, to scanning both small and large bar codes with the same scanner.

BACKGROUND OF THE INVENTION

Conventional bar codes have varying width bars and spaces suitably printed on a label. The bar code may take any conventional form in one or more dimensions, and includes, for example, the typical one-dimensional UPC form. The UPC symbology is based on a specification enacted by the Uniform Product Code Council, Inc. of Dayton Ohio. The typical UPC bar code includes a series or sequence of alternating dark bars and light spaces of varying widths. The bars and spaces are arranged in groups representing individual characters. The bar code starts with a left margin character and ends with a right margin character, and has a center reference character as well, with the characters provided there between representing any desired data.

The minimum width of either a bar or space in the UPC symbology is defined as a single module, which represents a unit width. The width of a single character coded using the UPC symbology is seven (7) modules. A seven module UPC character has two bar and two space elements which have varying widths to differentiate between the respective characters.

There are many types of bar code symbologies (encoding schemes). For example, there are a number of different one-dimensional bar code symbologies. These symbologies include UPCIEAN, Code 39, Code 128, Codabar and Interleaved 2 of 5. There are also 2 dimensional bar code symbologies.

Bar code scanners utilize a laser beam in order to illuminate a bar code, during the scanning process. The light reflected from the pattern of bars and spaces is analyzed in order to read the bar code. For the bar code to be read clearly the laser beam must be focused at or adjacent the bar code. Laser beams used to illuminate bar codes have a limited depth of field over which they are focused. Typically, the beam will focus several inches beyond the scanner window in order to maximize the portion of its usable range that is in the scan zone.

However, this results in the laser spot at the scan window being large and unfocused. When the operator encounters a small (demagnified) bar code he or she typically places the bar code on the window, where unfortunately it is even less likely to be read by the scanner.

It is an object of the present invention to produce a bar code scanner, which obviates the problems discussed above.

SUMMARY OF THE INVENTION

According to a first aspect of the present invention there is provided a bar code scanner having a housing including a surface having a transparent scanning window; and optical components including a spinner located within the housing and arranged to produce both a first set of scan lines focused outside of the housing and remote from the scanning window; and a second set of scan lines focused outside of the housing and adjacent the scanning window.

According to a second aspect of the present invention there is provided a method of scanning a bar code, utilizing a bar code scanner having a housing including a surface having a transparent scanning window; and optical components including a spinner located within the housing and arranged to produce both a first set of scan lines focused outside of the housing and remote from the scanning window; and a second set of scan lines focused outside of the housing and adjacent the scanning window, including the steps of placing a bar code to be read in either a first position where said first set of scan lines are focused or in a second position wherein said second set of scan lines are focused.

DESCRIPTION OF THE DRAWINGS

The invention, in accordance with preferred and exemplary embodiments, together with further objects and advantages thereof, is more particularly described in the following detailed description taken in conjunction with the accompanying drawings, in which.

DESCRIPTION OF THE PREFERRED EMBODIMENT

Figure 1:
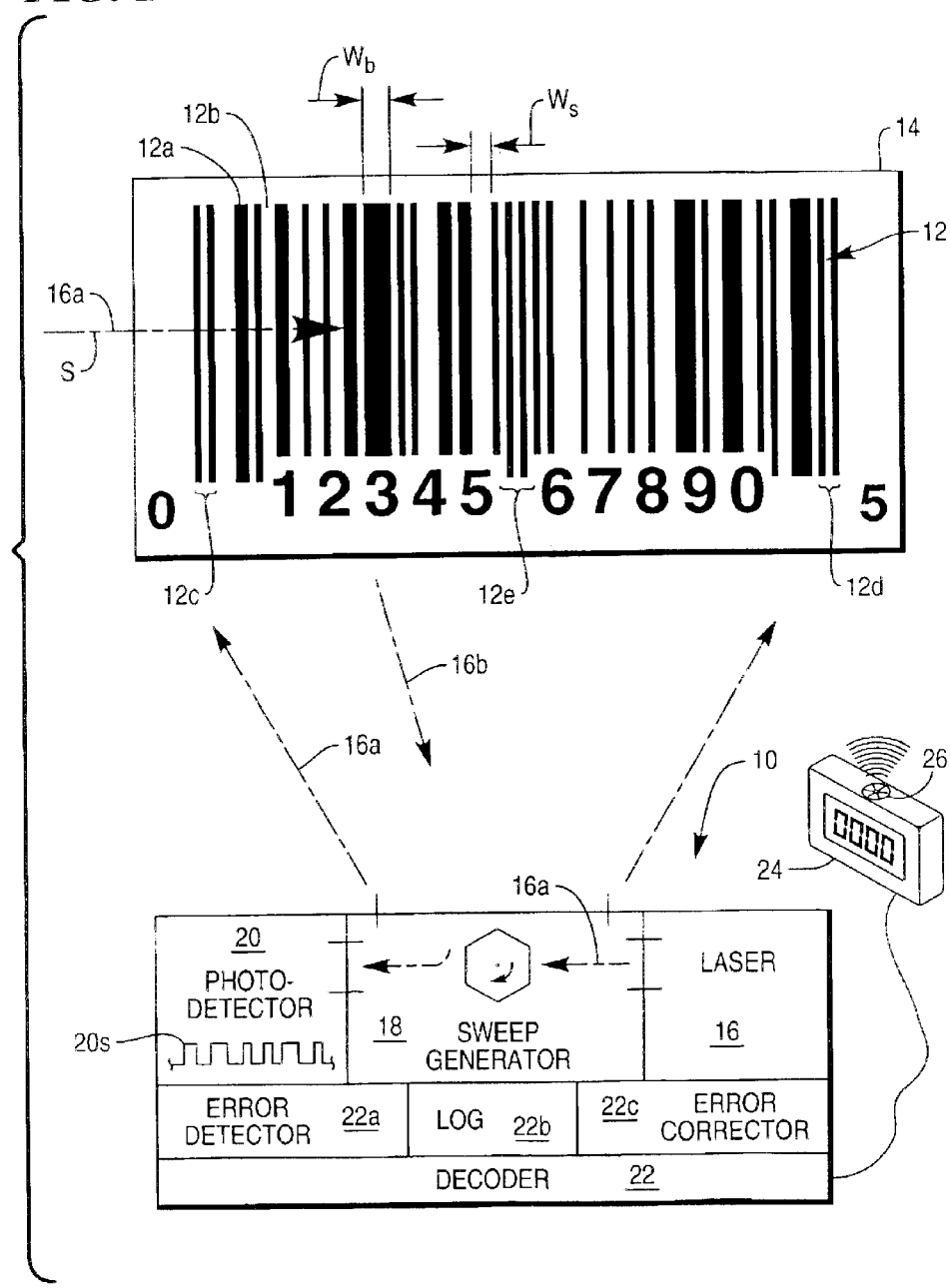
FIG. 1 is a schematic representation of a bar code scanner in accordance with the present invention.

Illustrated schematically in FIG. 1 is a laser bar code scanner 10 for scanning and decoding a conventional bar code 12 printed on a suitable label 14. The bar code 12 may take any conventional form in one or more dimensions including the conventional one-dimensional UPC symbology illustrated. The exemplary bar code 12 illustrated in FIG. 1 includes a plurality of sequential or alternating dark bars 12a and white spaces 12b, which are straight and parallel to each other and have corresponding varying widths $W_b$ and $W_s$. The bars and spaces are arranged in a plurality of sequential groups defining respective characters of equal width. The minimum width of a bar or a space is defined as the minimum width module, and in the UPC symbology must exceed 9 mils by specification. A single UPC character is defined as having two bars 12a and two spaces 12b of varying widths. And, the specified widths of a single character coded using the UPC symbology must, by specification, be seven modules. Furthermore, the UPC symbology defines the maximum bar width as being four modules.

In the exemplary bar code 12 illustrated in FIG. 1, the bar code conventionally starts with a left margin character 12c, ends with a right margin character 12d, and has a center reference character 12d, with the remaining bars and spaces there between defining desired data characters. As indicated above, each of the data characters has a total width of seven modules and includes two bars and two spaces.

The exemplary scanner 10 illustrated in FIG. 1 includes conventional means for optically scanning the bar code 12 sequentially across the bars and spaces 12a,b over the total width of the bar code 12 from the left margin character 12c to the right margin character 12d. In the preferred embodiment illustrated, scanning is accomplished by using a conventional laser 16 which emits a suitable laser beam 16a which is suitably scanned across the face of the bar code 12 by a conventional sweep generator 18 which may take the form of a rotating multifaceted mirror 38. The laser beam 16a is scanned transversely across the bar code 12 in a scan direction S so that back scattered light 16b reflects off the bars and spaces back to the scanner. Since the bars 12a are dark, very little light is back scattered therefrom, whereas the spaces 12b are substantially white and more effectively backscatter light to the scanner.

A conventional photodetector 20 is provided in the scanner 10 and is suitably optically aligned therein for receiving the back scattered light 16b and producing an electrical bar code signature 20s alternating in intensity between maximum and minimum values corresponding with the back scattered light 16b from the spaces 12b and bars 12a, respectively. The time duration of the maximum and minimum intensity portions of the signature 20s corresponds with the varying widths of the bars and spaces. Since the scan beam 16a is scanned across the bar code 12 at a known and constant rate of speed, the bar code signature 20s is representative of the bar code 12 itself and may be decoded in a conventional decoder 22 specifically configured for the corresponding bar code symbology printed on the label 14.

The decoder 22 may take any conventional form and is typically a digitally programmable microprocessor containing suitable software for analyzing the bar code signature 20s and decoding the data contained therein. The scanner 10 is electrically joined to a suitable display 24 which may be used for displaying certain information encoded in the bar code 12, such as the price of a consumer product represented thereby. When the bar code 12 is accurately scanned and decoded, the data may be presented on the display 24, and a small speaker 26 operatively joined to the scanner 10 may beep to indicate successful decoding of the bar code 12.

Figure 2:
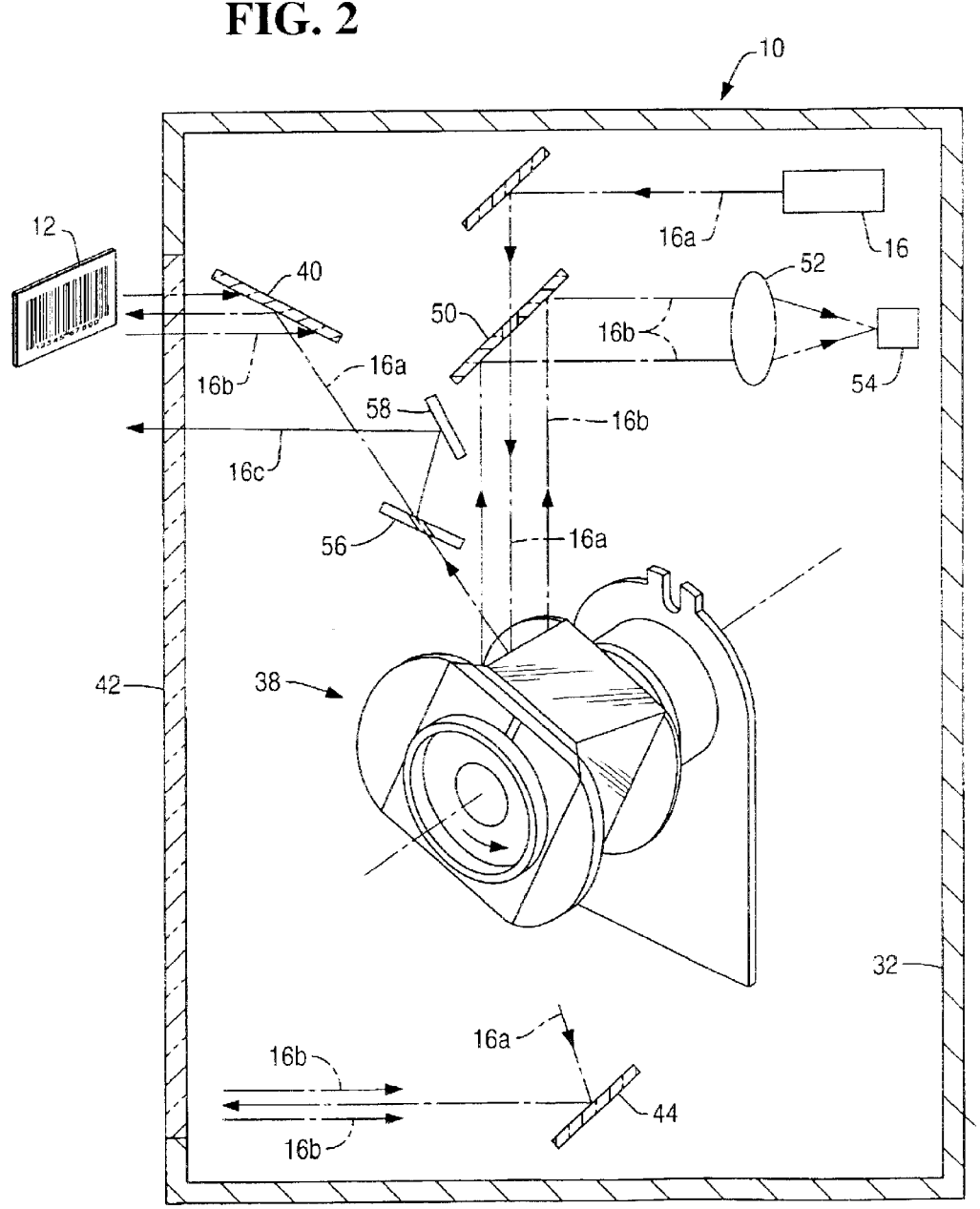
FIG. 2, is a schematic representation of the optical arrangement of the scanner of FIG. 1.

FIG. 2 illustrates a barcode scanner 10, which may be configured for presentation or pass-by operation as desired. The scanner includes a housing 32 in which its various operating components are suitably mounted.

A laser 16, typically in the form of a laser diode, is mounted in the housing for emitting an outbound laser beam 16a. A rotary spinner 38 is suitably disposed in the outbound optical beam path with the laser 16 for segmenting the beam in corresponding optical paths in alignment with a plurality of primary pattern mirrors 40 which reflect corresponding scan lines out a transparent window 42 of the scanner 10. The scan lines may be produced from direct reflection between the spinner and the primary pattern mirrors, or secondary pattern mirrors 44 may be optically aligned with corresponding ones of the primary pattern mirrors to produce the desired scan line pattern emitted through the scanning window 42.

The pattern mirrors may be oriented in the scanner housing 32 in any conventional manner for producing the desired scan line pattern for each revolution of the spinner 38. In this way, a conventional barcode 12 may be positioned in front of the window 42 for being traversed by any one or more of the scan lines in the pattern for returning reflected light 16b therefrom inbound in the opposite direction for collection by the pattern mirrors 40, 44 and rotating spinner 38 for decoding.

A suitable collection mirror 50 is suitably optically aligned between the laser 16 and the spinner 38, and typically includes a center aperture therein, through which the outbound scan beam 16a passes without obstruction. Since the reflected light 16b is diffuse from being reflected off the barcode 46, the pattern mirrors, spinner, and collection mirror 50 are suitably sized in area for collecting sufficient reflected light 16b for use in decoding the barcode.

The reflected or collection light 16b is reflected from the collection mirror 50 and focused through a suitable focusing lens 52 onto a conventional photodetector 54 which produces a corresponding electrical signal which is decoded in the electrical controller of the scanner in a conventional manner.

The scanner 10 further comprises a beam splitter 56 and an additional mirror 58. The beam splitter 56 creates a secondary laser beam 16c, which is directed through the scanning window 42 via the additional mirror 58. In this way the secondary laser beam 16c travels a greater optical path than the primary laser beam, prior to leaving the housing 32. Consequently, the secondary laser beam will be focused closer to the scanning window 42 than the primary laser beam. If the optical path lengths are adjusted accurately the secondary laser beam can be focussed adjacent the scanning window 42.

In another embodiment, not shown, the additional mirror 58 can be replaced by a slab of material with a high refractive index, which is placed in the path of the secondary laser beam, thus increasing its optical path length prior to reaching the scanning window 42. If the slab is wedge shaped the specific increase in optical path length can be adjusted by varying the width of the material in the optical path of the secondary laser beam. Thus the point of focus of the secondary laser beam, i.e. its distance from the scanning window, can be adjusted.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What I claim is:

1. A bar code scanner comprising:
    a housing including a surface having a transparent scanning window;
    a laser within the housing for producing a laser beam;
    a spinner within the housing and arranged to reflect the laser beam;
    pattern mirrors; and
    an optical splitter within the housing and optically aligned between the spinner and the pattern mirrors to receive the laser beam and produce first and second sets of scanning beams directed at the pattern mirrors and focused outside of the housing;
    wherein the optical splitter focuses the first set of scanning beams remote from the scanning window and focuses the second set of scanning beams adjacent the scanning window.

2. The bar code scanner of claim 1, wherein the first set of scanning beams is focused between 2 and 4 inches from the scanning widow.

3. The bar code scanner of claim 1, wherein the laser comprises a laser diode.

4. The bar code scanner of claim 1, further comprising an additional mirror located so as to reflect a portion of the light split by the beam splitter through the scanning window, after having traversed a distance within the housing which was greater than the distance traversed by the remainder of the light.

5. A method of scanning a bar code comprising the steps of:
    producing a laser beam by a laser within a scanner housing;
    reflecting the laser beam by a mirrored spinner within the scanner housing;
    producing first and second sets of scanning beams directed at pattern mirrors within the scanner housing by an optical splitter within the housing and optically aligned between the spinner and the pattern mirrors;
    focusing the first set of scanning beams outside and remote from the scanning window by the optical splitter;

focusing the second set of scanning beams outside and adjacent the scanning window; and reading a bar code in either a first position where said first set of scan lines are focused or in a second position wherein said second set of scan lines are focused.

6. A method as claimed in claim 5, wherein first bar codes are placed in said first position and second bar codes smaller than the first bar codes are placed in said second position.

* * * * *

UNITED STATES PATENT AND TRADEMARK OFFICE
CERTIFICATE OF CORRECTION

PATENT NO. : 6,820,811 B1  Page 1 of 1
DATED : November 23, 2004
INVENTOR(S) : Detwiler, P. O.

It is certified that error appears in the above-identified patent and that said Letters Patent is hereby corrected as shown below:

<u>Column 4,</u>
Line 46, delete "widow" and substitute -- window --.

Signed and Sealed this

Thirty-first Day of May, 2005

JON W. DUDAS
*Director of the United States Patent and Trademark Office*